(12) United States Patent
Roo

(10) Patent No.: US 7,564,900 B1
(45) Date of Patent: *Jul. 21, 2009

(54) MIXED-MODE SIGNAL PROCESSOR ARCHITECTURE AND DEVICE

(75) Inventor: Pierte Roo, Sunnyvale, CA (US)

(73) Assignee: Marvell International Ltd., Hamiltion (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/287,077

(22) Filed: Oct. 6, 2008

Related U.S. Application Data

(63) Continuation of application No. 10/443,972, filed on May 22, 2003, now Pat. No. 7,433,401.

(51) Int. Cl.
*H03H 7/30* (2006.01)
*H03K 5/159* (2006.01)

(52) U.S. Cl. .................. 375/233; 375/229; 375/230; 375/232

(58) Field of Classification Search .......... 375/229, 375/230, 232, 233
See application file for complete search history.

(56) References Cited

U.S. PATENT DOCUMENTS

| | | | | |
|---|---|---|---|---|
| 3,622,693 | A * | 11/1971 | Del Ciello et al. | 348/642 |
| 4,422,175 | A * | 12/1983 | Bingham et al. | 375/232 |
| 5,675,612 | A * | 10/1997 | Solve et al. | 375/326 |
| 6,363,129 | B1 | 3/2002 | Agazzi et al. | |
| 6,459,746 | B2 | 10/2002 | Agazzi et al. | |
| 6,600,780 | B1 * | 7/2003 | Wang et al. | 375/233 |
| 6,947,482 | B2 | 9/2005 | Azazzi et al. | |
| 7,184,475 | B2 * | 2/2007 | Dohmen et al. | 375/232 |
| 7,254,194 | B2 | 8/2007 | Lin et al. | |
| 2001/0019584 | A1 | 9/2001 | Azazzi et al. | |
| 2003/0142659 | A1 * | 7/2003 | Lin et al. | 370/351 |
| 2007/0031153 | A1 * | 2/2007 | Aronson et al. | 398/138 |

FOREIGN PATENT DOCUMENTS

| WO | WO 02/23754 A2 | 3/2002 |
|---|---|---|
| WO | WO 02/23754 A3 | 3/2002 |

OTHER PUBLICATIONS

Kelly et al., "A Mixed-Signal DFE/FFE Receiver for 100Base-TX Applications," 2000 IEEE International Solid-State Circuits Conference, Feb. 7-9, 2000, pp. 310-311.*
USPTO Non-Final Office Action mailed Sep. 6, 2006 for U.S. Appl. No. 10/443,972, filed May 22, 2003.
Amendment filed Dec. 11, 2006 in response to USPTO to Non-Final Office Action mailed Sep. 6, 2006 for U.S. Appl. No. 10/443,972, filed May 22, 2003.

(Continued)

*Primary Examiner*—David B Lugo

(57) ABSTRACT

A mixed-mode signal processor includes a first summer having a first input that receives a first analog signal, a second input and an output that supplies a second analog signal. A decision circuit outputs a digital signal based on the second analog signal. A mixed-mode decision feedback equalizer (DFE) includes a plurality of tap weights and outputs a DFE signal to the second input of the summer based on the first analog signal, the digital signal and the plurality of tap weights.

12 Claims, 9 Drawing Sheets

OTHER PUBLICATIONS

USPTO Non-Final Office Action mailed Mar. 6, 2007 for U.S. Appl. No. 10/443,972, filed May 22, 2003.

Response filed Jun. 8, 2007 in response to USPTO Non-Final Office Action mailed Mar. 6, 2007 for U.S. Appl. No. 10/443,972, filed May 22, 2003.

USPTO Non-Final Office Action mailed Sep. 19, 2007 for U.S. Appl. No. 10/443,972, filed May 22, 2003.

Amendment filed Dec. 18, 2007 in response to USPTO Non-Final Office Action mailed Sep. 19, 2007 for U.S. Appl. No. 10/443,972, filed May 22, 2003.

USPTO Non-Final Office Action mailed Mar. 20, 2008 for U.S. Appl. No. 10/443,972, filed May 22, 2003.

Amendment Accompanying Request for Continued Examination filed May 16, 2008 in response to USPTO Final Office Action mailed Mar. 20, 2008 for U.S. Appl. No. 10/443,972, filed May 22, 2003.

* cited by examiner

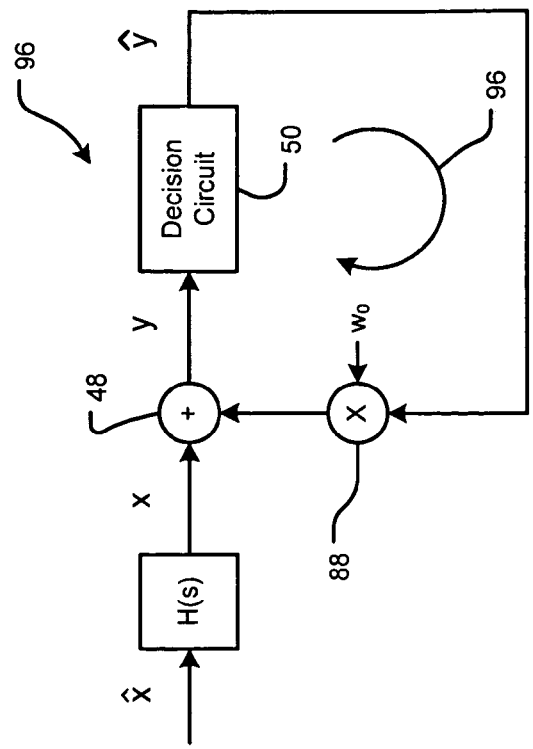
FIG. 3
_Prior Art_
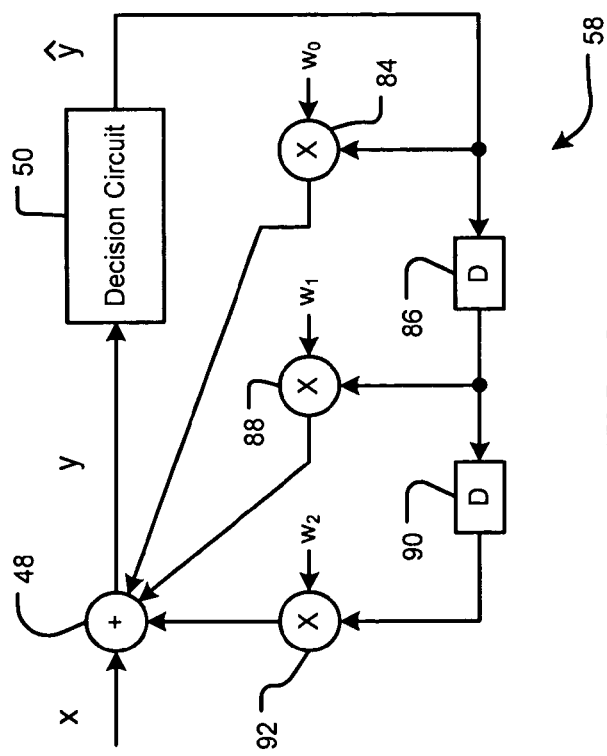
FIG. 2
_Prior Art_

MIXED-MODE SIGNAL PROCESSOR ARCHITECTURE AND DEVICE

CROSS-REFERENCE TO RELATED APPLICATIONS

This application is a continuation of U.S. patent application Ser. No. 10/443,972, filed on May 22, 2003. The disclosure of the above application is incorporated herein by reference in its entirety.

FIELD OF THE INVENTION

The present invention relates to signal processors for communications channels, and more particularly to a signal processor having a mixed-mode architecture and a mixed-mode decision feedback equalizer.

BACKGROUND OF THE INVENTION

Communications systems often employ digital signal processors (DSPs) on the receiver end of a communications channel. The DSPs apply amplification, filtering and/or equalization to reduce attenuation, distortion and other channel effects. The channel may cause intersymbol interference (ISI), for example when the transmitted signals have a data rate that exceeds the bandwidth of the communications channel. When a transmitted symbol having a period of T is transmitted, the received signal may have a period that exceeds T, which may interfere with subsequent transmitted symbols.

Referring now to FIG. 1, an exemplary digital signal processor (DSP) 30 receives a signal from a communications channel. The transmitted signal may be a differential signal {1, −1} or any other type of signal. The DSP 30 includes an analog portion 32 and a digital portion 34. The analog portion 32 includes an amplifier 40 that receives the analog input signal from the communications channel. An output of the amplifier 40 is input to an analog to digital converter (ADC) 42, which converts the received analog signal to a digital signal.

An output of the ADC 42 is input to a finite impulse response (FIR) filter 44, which performs filtering using one or more taps and delay elements. An output of the FIR filter 44 is input to a non-inverting input of a summer 48, which has an output that is input to a decision circuit 50 and to a non-inverting input of a summer 54. The decision circuit 50 attempts to identify the transmitted signal based upon the received signal. The decision circuit 50 is typically implemented using a comparator, which compares the received signal to a predetermined threshold.

An output of the decision circuit 50 is input to an inverting input of the summer 54 and to an input of a decision feedback equalizer (DFE) 58. The DFE 58 is operated in a manner that is similar to a FIR filter. The DFE 58 attempts to eliminate the ISI effects of a detected symbol on future received symbols. The DFE 58 includes one or more taps having tap weights and one or more delay elements. An output of the DFE 58 is fed back to an inverting input of the summer 48.

An output of the summer 54 is input to an adaptation circuit 60, which gradually adjusts parameters of the DSP 30 to minimize errors. For example, the adaptation circuit 60 may be a least means squared (LMS) adaptation circuit. The adaptation circuit 60 outputs adjusted tap weights to the DFE 58 and adjusted timing to a phase locked loop (PLL) 64. The adaptation circuit 60 may also output an automatic gain control (AGC) signal to the amplifier 40, which adjusts the gain of the amplifier 40. The PLL 64 receives the timing adjustments and outputs a clock signal to the ADC 42.

Referring now to FIGS. 2 and 3, the DFE 58 is shown in further detail. In FIG. 2, the received signal x from the communications channel is input to the summer 48, which has an output y that is input to the decision circuit 50. An output of the decision circuit 50 or $\hat{y}$ is input to a multiplier 84, which has another input that is connected to a tap weight $w_0$. The output of the decision circuit 50 is also input to a delay element 86. An output of the delay element 86 is input to a multiplier 88, which has another input that is connected to a tap weight $w_1$. The output of the delay element is also input to a delay element 90. An output of the delay element 90 is input to a multiplier 92, which has another input that is connected to a tap weight $w_2$. Outputs of the multipliers 84, 88 and 92 are input to the summer 48. As can be appreciated, additional or fewer delay elements and tap weights can be used.

In the example illustrated in FIG. 2, the DFE 58 implements the function:

$$y_k = x_k - (\hat{y}_k w_0 + \hat{y}_{k-1} w_1 + \hat{y}_{k-2} w_2)$$

$$y_k = x_k - \sum_{i=0}^{N} \hat{y}_{k-i} w_i$$

The tap weight $w_0$ of the DFE 58 defines a critical path that is shown in a simplified form in FIG. 3. When the transmitted signal $\hat{x}$ is transmitted over a communications channel, the transmitted signal $\hat{x}$ is altered by the communications channel. The function H(s) in FIG. 3 represents the transfer function of the communications channel. The transmitted signal $\hat{x}=\{1, -1\}$ is the desired signal and x is the received signal after transmission over the channel, where x=$\hat{x}$*H(s) and where * is a convolution function.

The critical path 96 is formed by a path y→decision block→$\hat{y}$→$\hat{y}w_0$→x−$\hat{y}w_0$=1T. As the frequency of operation increases and approaches and/or exceeds 1 GHz, the ADC 42 becomes increasingly more difficult to implement. Even if the ADC 42 can be implemented at a desired high operating frequency, the power that is required to operate the ADC 42 becomes prohibitive.

SUMMARY OF THE INVENTION

A mixed-mode signal processor architecture according to the present invention provides decision feedback equalization for a communications channel. A decision circuit receives an analog signal and outputs a digital signal. A mixed-mode decision feedback equalizer (DFE) includes a plurality of tap weights and produces a DFE signal using the analog signal, the digital signal and the tap weights.

In other features, a first summer has a first input that communicates with an input of the decision circuit, a second input that communicates with an output of the decision circuit, and an output. An adaptation circuit communicates with the output of the first summer and adjusts the tap weights of the mixed-mode DFE.

In still other features, a phase locked loop (PLL) outputs a clock signal to the decision circuit. The adaptation circuit adjusts the clock signal of the PLL. An amplifier amplifies a received signal from the communications channel. The adaptation circuit generates an automatic gain control signal that adjusts a gain of the amplifier.

In yet other features, a second summer has a first input that receives the analog signal, a second input that receives the DFE signal and an output that communicates with the decision circuit. The mixed-mode DFE includes a voltage to current converter that converts the analog signal to a current signal. A polarity switching circuit selectively switches a polarity of the current signal based on an output of the decision circuit. A current scaling circuit receives an output of the polarity switching circuit and scales the current signal using a first tap weight.

In still other features, the mixed-mode DFE includes a first comparator having a reset stage and an output stage. A second comparator has a reset stage and an output stage. The reset stage of the first comparator overlaps the output stage of the second comparator. The mixed-mode DFE includes a voltage to current converter that converts the analog signal to a current signal. A first polarity switching circuit selectively adjusts a polarity of the current signal based on an output of the first comparator. A second polarity switching circuit selectively adjusts a polarity of the current signal based on an output of the second comparator. A current scaling circuit receives outputs of the first and second polarity switching circuits and scales the current signal using a first tap weight.

In still other features, the mixed-mode DFE includes a delay element that receives the current signal and that outputs a first delayed signal. A second multiplier multiplies the first delayed signal by a second tap weight to generate a second product. A second delay element receives the first delayed signal and outputs a second delayed signal. A third multiplier multiplies the second delayed signal by a third tap weight to generate a third product.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a functional block diagram of a decision feedback loop according to the prior art;

FIG. 3 is a functional block diagram of a critical path defined by part of the decision feedback loop according to the prior art;

DETAILED DESCRIPTION OF THE PREFERRED EMBODIMENTS

Figure 1:
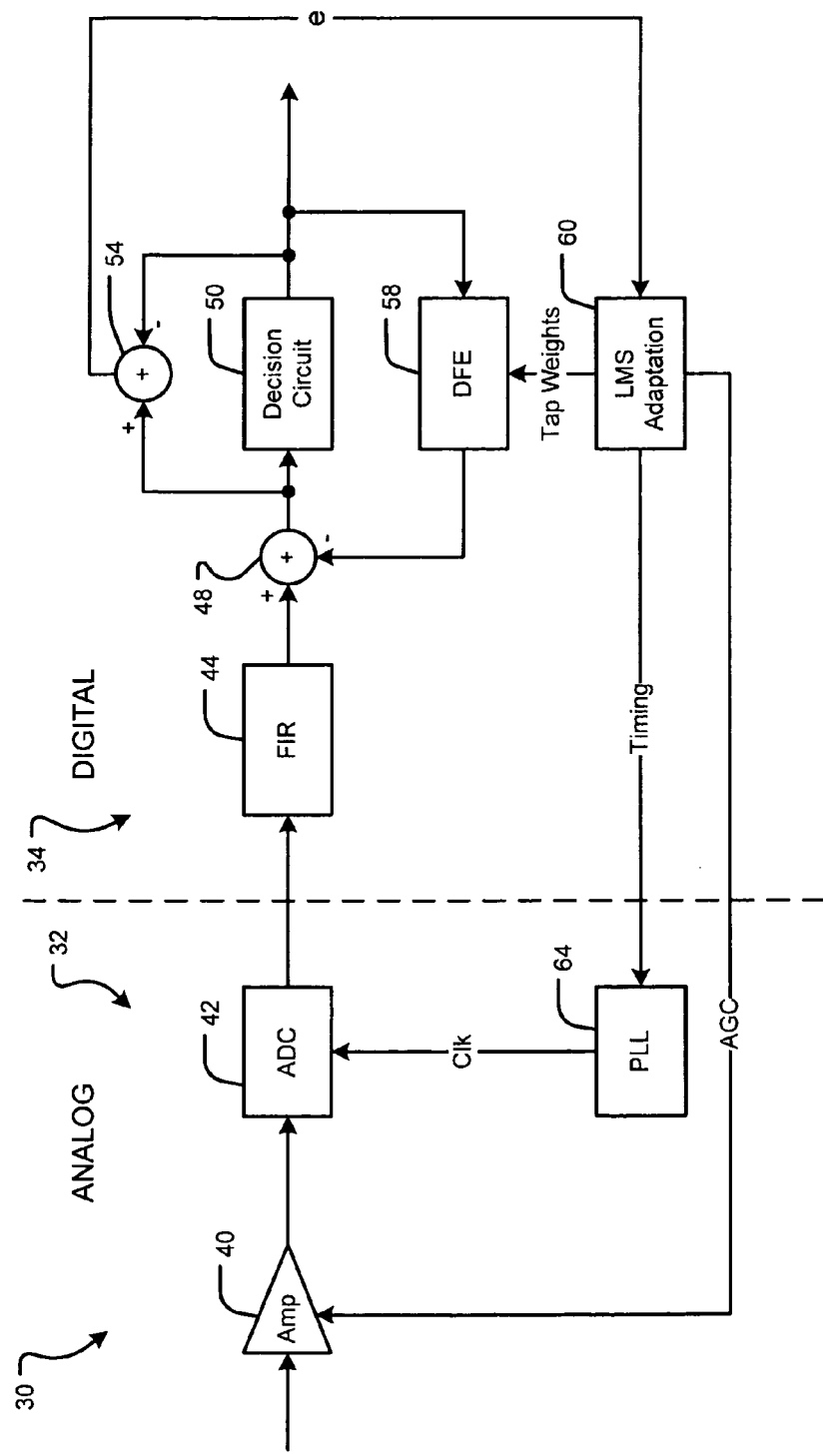
FIG. 1 is a functional block diagram of a digital signal processor according to the prior art.

The following description of the preferred embodiment(s) is merely exemplary in nature and is in no way intended to limit the invention, its application, or uses. For purposes of clarity, the same reference numbers will be used in the drawings to identify similar elements.

Figure 4:
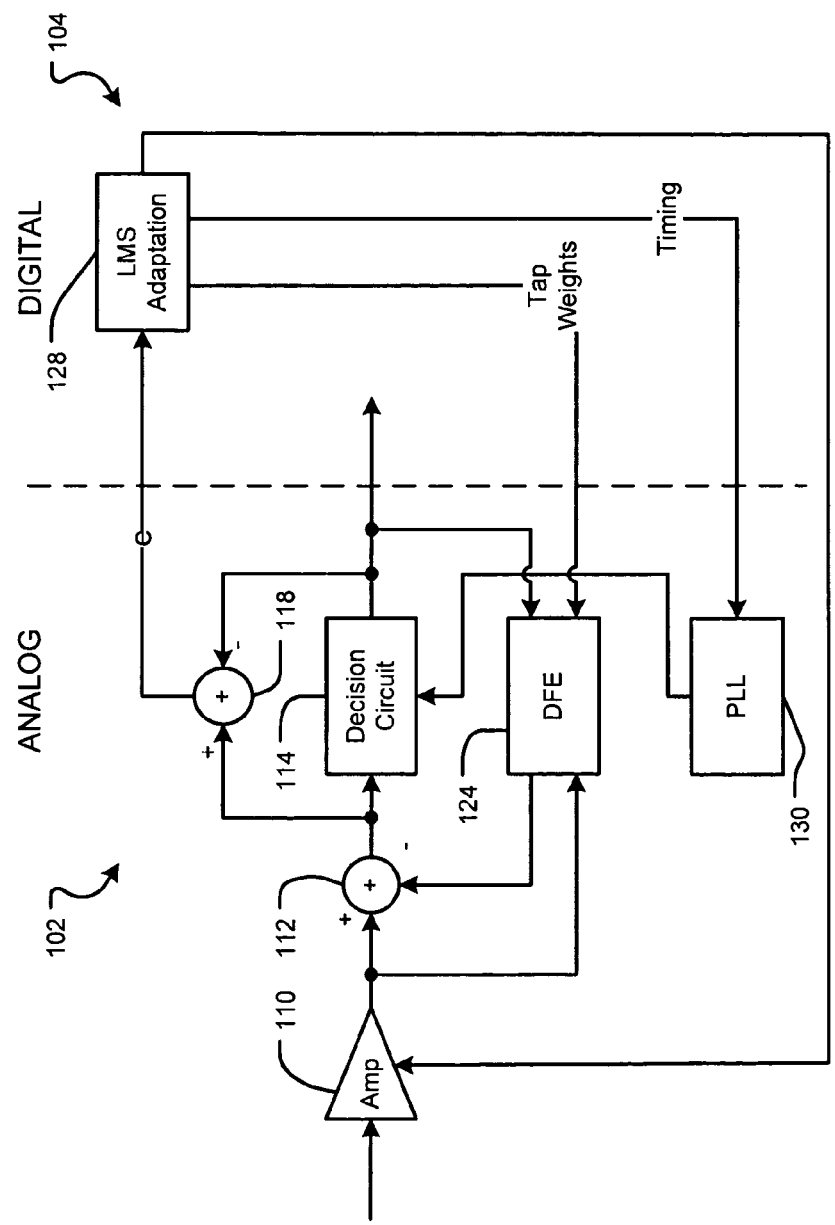
FIG. 4 is a functional block diagram of a mixed-mode signal processor with a mixed-mode decision feedback loop according to the present invention.

Referring now to FIG. 4, an architecture for a mixed-mode signal processor 100 according to the present invention is shown. The mixed-mode signal processor 100 includes an analog portion 102 and a digital portion 104. The analog portion 102 includes an amplifier 110 that amplifies a received analog signal x and outputs the amplified signal to a non-inverting input of a summer 112. The transmitted signal $\hat{x}$ corresponding to the received signal x can be a differential signal $\{1, -1\}$ or any other signal. An output of the summer 112 is input to a decision circuit 114 and to a non-inverting input of a summer 118.

The decision circuit 114 can be implemented using a comparator, which compares the input signal to a predetermined threshold. The decision circuit 114 decides whether the input signal corresponds to a first state such as 1 or a second state such as −1. An output of the decision circuit 114 is connected to an inverting input of the summer 118 and to a mixed-mode DFE 124 according to the present invention. In a preferred embodiment, the DFE 124 is a mixed-mode DFE 124, as will be described below.

An output of the summer 118 is input to a digital adaptation device 128, which updates tap weights of the DFE 124. The adaptation device 128 also updates timing of a phase locked loop (PLL) 130, which generates a clock signal for the decision circuit 114. The adaptation device 128 also outputs an AGC signal to the amplifier 110, which adjusts the gain of the amplifier 110. The adaptation device 128 can be a least means squared (LMS) adaptation device.

Figure 5:
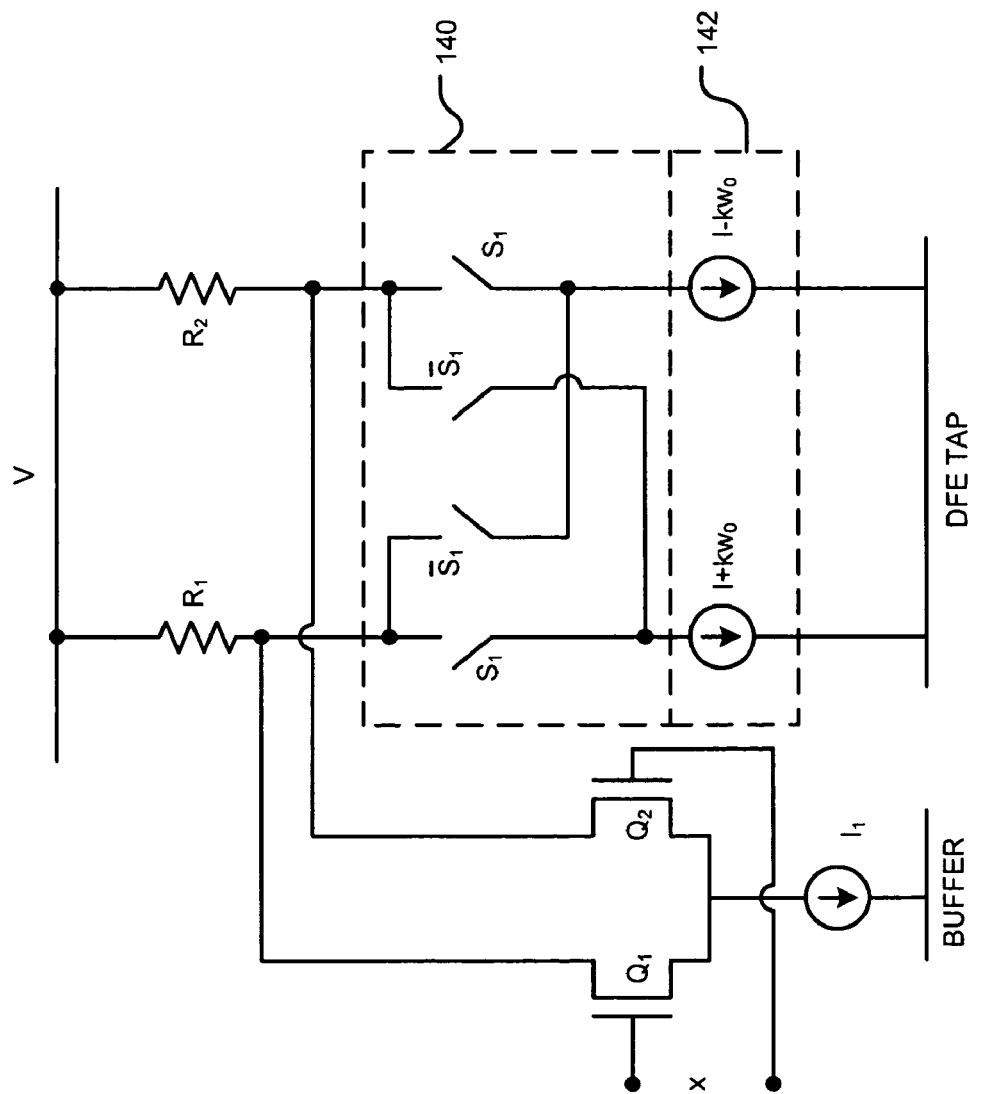
FIG. 5 is a functional block diagram of a critical path of the mixed-mode decision feedback loop of FIG. 4 in further detail.

Referring now to FIG. 5, the DFE 124 is shown in further detail. The differential input x is connected to bases of transistors $Q_1$ and $Q_2$. Sources of the transistors $Q_1$ and $Q_2$ are connected to a current buffer $I_1$. The transistors $Q_1$ and $Q_2$ and the current buffer $I_1$ perform voltage to current conversion of the received signal. Resistors $R_1$ and $R_2$ have first ends that are connected to a voltage reference. Second ends of the resistors $R_1$ and $R_2$ are connected to drains of the transistors $Q_1$ and $Q_2$ and to a polarity switching circuit 140. The polarity switching circuit 140 includes switches $S_1$ and $\overline{S}_1$ that receive an output of the decision circuit 114. In effect, the decision circuit 114 and the polarity switching circuit 140 multiply the differential input signal x by 1 or −1, depending upon the result of the comparison made by the decision circuit 114.

Figure 6:
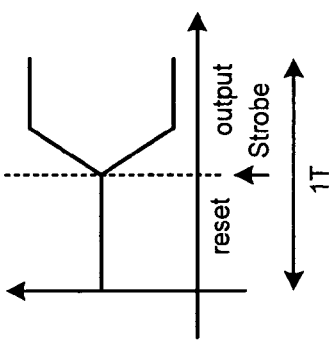
FIG. 6 is a graph illustrating reset and output stages of a decision circuit.

More particularly, when the decision circuit 114 turns on switches $S_1$, the input to the polarity switching circuit 140 is multiplied by 1. When the decision circuit 114 turns on switches $\overline{S}_1$, the input to the polarity switching circuit 140 is multiplied by −1. A current scaling circuit 142 operates in the current domain and provides current scaling using the tap weight $w_0$ and a constant k. Referring now to FIG. 6, the decision circuit 82 requires a reset period between decisions (that are provided during an output period). The reset period increases overhead of the critical path 96, which limits the operating frequency of the DFE 124. The reset period plus the output period have a duration of 1T.

Figure 8:
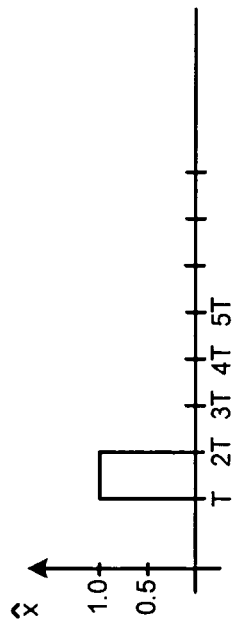
FIG. 8 is a graph illustrating an exemplary transmitted signal.
Figure 9:
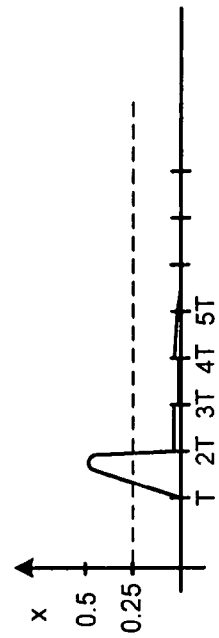
FIG. 9 is a graph illustrating an exemplary received signal summed with a DFE feedback signal.
Figure 7:
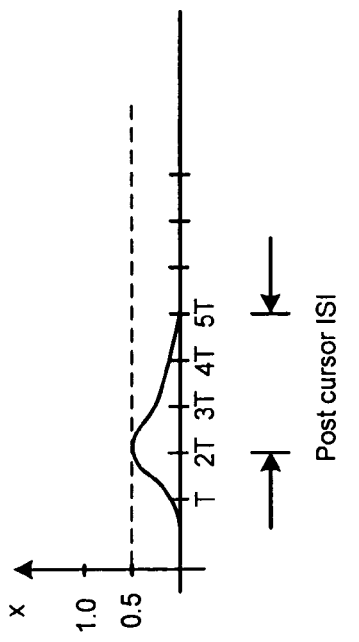
FIG. 7 is a graph illustrating an exemplary received signal.

Referring now to FIGS. 7-9, the operation of a DFE 124 is shown in greater detail. In some communications channels, the bandwidth of the channel is less than the frequency of operation. As a result, the received signal x is spread out over multiple periods. In FIGS. 7 and 8, the actual period of the differential signal will not be T and the value of the differential signal x will not be −1 or 1. For example, when $\hat{x}$ is 1 and has a period of 1T as shown in FIG. 8, the received signal x may have a lower amplitude (such as approximately 0.5) and the pulse width will exceed 1T. In this example, the amplitude of x is greater than zero at 1T and falls back to zero after 5T.

The DFE 124 attempts to cancel the effects of the received signal x that occur after 2T. A DFE tap weight $w_0$ attempts to offset the effects of the received signal x that occur at 3T. A DFE tap weight $w_1$ attempts to offset the effects of the received signal x that occur at 4T. A DFE tap weight $w_2$ attempts to offsets the effects of the received signal x that occur at 5T. While the signals at these successive periods are not cancelled completely, substantial cancellation occurs. As a result of the cancellation provided by the DFE 124, the decision circuit 114 can use a lower threshold to decide whether a signal is present, which improves accuracy. For example, a lower threshold of 0.25 can be used in FIG. 9 as compared to 0.5 in FIG. 7.

Figure 11:
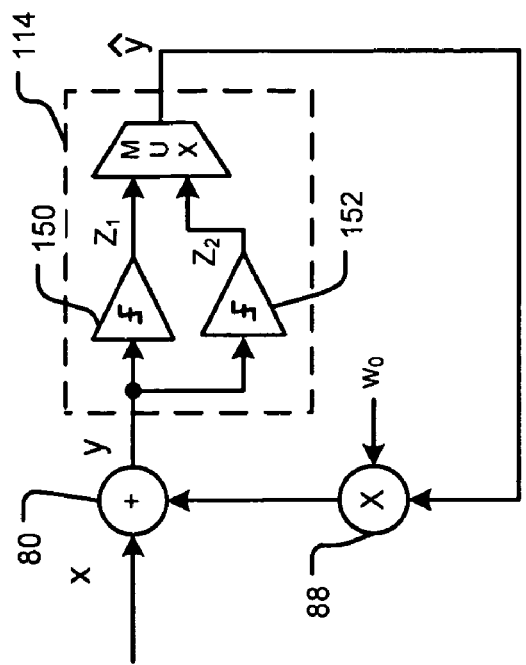
FIG. 11 is a functional block diagram of the critical path of the DFE including a decision circuit with first and second comparators.
Figure 10:
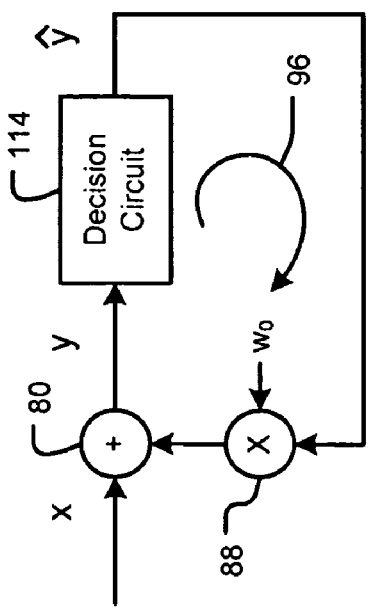
FIG. 10 is a functional block diagram of the critical path of the DFE.

Referring now to FIGS. 10 and 11, to reduce the effect of the reset overhead on the critical path 96, the decision circuit 114 is preferably implemented using first and second comparators 150 and 152. As can be appreciated, additional comparators can be used in the decision circuit to further reduce reset overhead and to increase switching speeds. A multiplexer 160 alternately selects the output of the first and second comparator 150 or 152, respectively, as will be described below. As a result, the effect of the reset overhead on the critical path is reduced.

Figure 12:
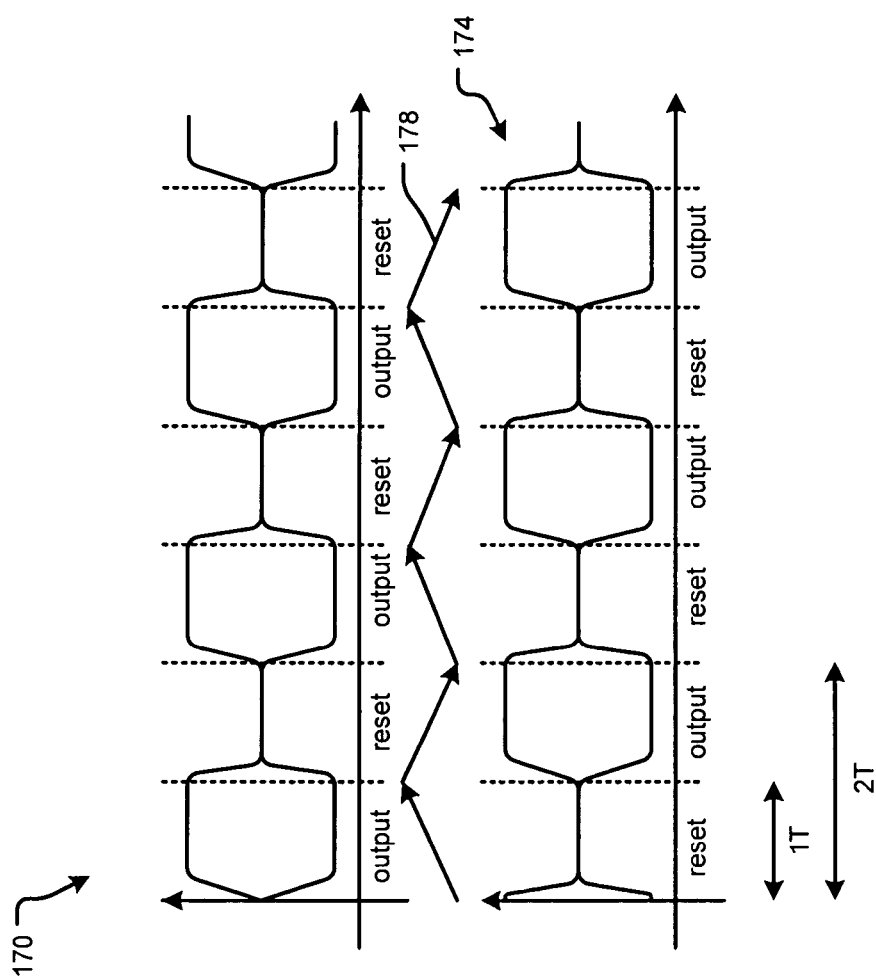
FIG. 12 illustrates a staggered output of the first and second comparators in the decision circuit of FIG. 11.

Referring now to FIG. 12, the output of the first comparator 150 is shown at 170 and the output of the second comparator 152 is shown at 174. The selection of the output by the multiplexer 160 is shown schematically at 178. While one of the comparators 150 or 152 is in a reset state, the other comparator 152 or 150 is in an output state. The comparator with the output state is selected. As a result, the comparators 150 and 152 can be operated at a slower rate. In other words, the comparators 150 and 152 are operated such that the reset state occurs within 1T and the reset and output states occur within 2T.

Figures 13, 15:
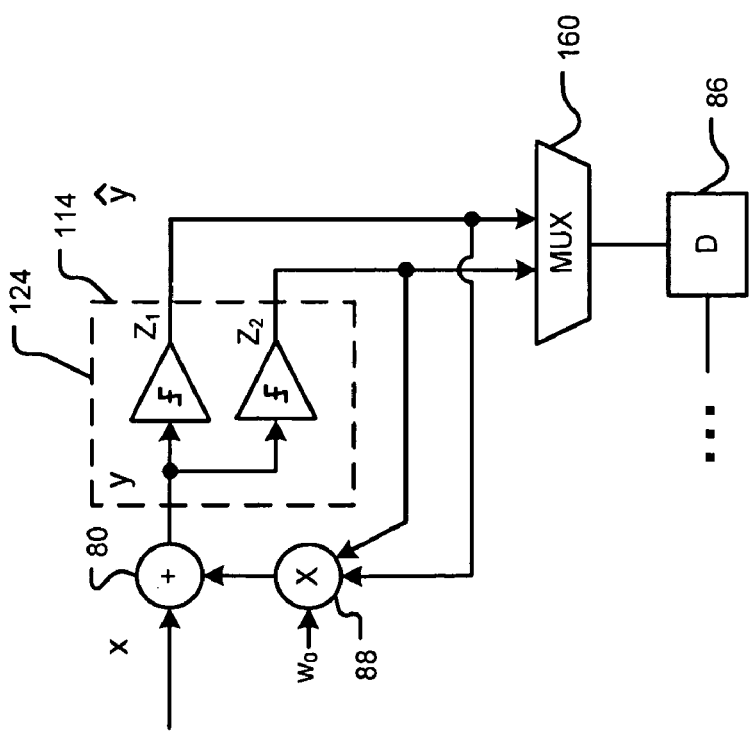
FIG. 13 illustrates a DFE with direct coupling to reduce latency.
FIG. 15 is a truth table for switches in the polarity switching circuit for output and reset stages of the comparators in the DFE.

Referring now to FIG. 13, some additional latency is added to the critical path 96 by the multiplexer 160. To eliminate the effects of this latency, the outputs of the decision circuit 124 (in other words, the outputs of the comparators 150 and 152) are directly coupled to the multiplier 88. In this embodiment, the multiplexer 160 is located outside of the critical path 96. The delay element 86 only needs a sufficient amount of time to latch the data.

Figure 14:
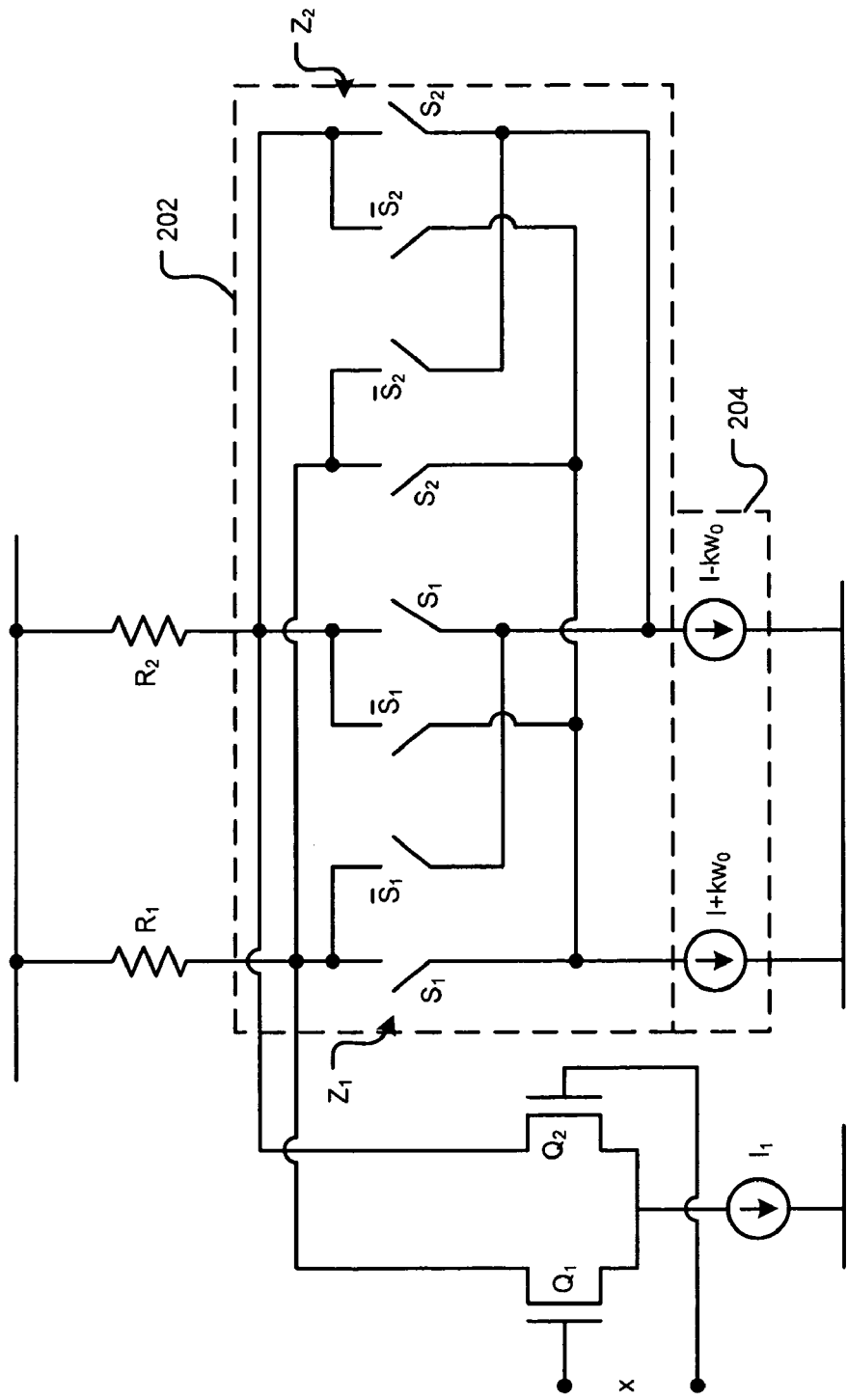
FIG. 14 illustrates polarity switching circuits and current scaling circuits for the DFE of FIG. 13.

Referring now to FIG. 14, one suitable implementation of a DFE 200 includes a polarity switching circuit 202 with switches $S_1$ and $\overline{S}_1$ that are driven by the first comparator 150 and switches $S_2$ and $\overline{S}_2$ that are driven by the second comparator 152. The DFE 200 includes a current scaling circuit 204 as described above. In FIG. 15, a truth table for the switches in the polarity switching circuit 202 are shown for output and reset states. When in the output with $Z_1=1$ or $Z_2=1$, switches $S_1$ and $S_2$ are on and switches $\overline{S}_1$ and $\overline{S}_2$ are off. When in the output state with $Z_1=-1$ or $Z_2=-1$, switches $S_1$ and $S_2$ are off and switches $\overline{S}_1$ and $\overline{S}_2$ are on. When in the reset state, switches $\overline{S}_1$ and $\overline{S}_2$ are on and switches $S_1$ and $S_2$ are off.

Those skilled in the art can now appreciate from the foregoing description that the broad teachings of the present invention can be implemented in a variety of forms. While the present invention is particularly suited to operation at speeds of 1 GHz and above, the present invention may also be used at lower operating frequencies. Therefore, while this invention has been described in connection with particular examples thereof, the true scope of the invention should not be so limited since other modifications will become apparent to the skilled practitioner upon a study of the drawings, the specification and the following claims.

What is claimed is:

1. A mixed-mode signal processor, comprising:
   a first summer having a first input that receives a first analog signal,
   a second input, and
   an output that supplies a second analog signal;
   a decision circuit that outputs a digital signal based on the second analog signal;
   a mixed-mode decision feedback equalizer (DFE) that includes a plurality of tap weights and that outputs a DFE signal to the second input of the first summer based on the first analog signal, the digital signal, and the plurality of tap weights.

2. The mixed-mode signal processor of claim 1, wherein the decision circuit compares the second analog signal to a threshold and outputs the digital signal based on the comparison.

3. The mixed-mode signal processor of claim 1, further comprising a second summer that has
   a first input that receives the second analog signal,
   a second input that communicates with an output of the decision circuit, and
   an output.

4. The mixed-mode signal processor of claim 3 further comprising an adaptation circuit that communicates with the output of the second summer and that adjusts the plurality of tap weights of the mixed-mode DFE.

5. The mixed-mode signal processor of claim 4 further comprising a phase locked loop (PLL) that outputs a clock signal to the decision circuit, wherein the adaptation circuit adjusts the clock signal of the PLL.

6. The mixed-mode signal processor of claim 4 further comprising a variable gain amplifier that amplifies a received signal to generate the first analog signal, wherein the adaptation circuit generates an automatic gain control signal that adjusts a gain of the variable gain amplifier.

7. The mixed-mode signal processor of claim 1, wherein the mixed-mode DFE includes:
   a converter that converts the first analog signal to a current signal; and
   a polarity switching circuit that selectively switches a polarity of the current signal based on an output of the decision circuit.

8. The mixed-mode signal processor of claim 7, wherein the mixed-mode DFE includes a current scaling circuit that receives an output of the polarity switching circuit and that scales the current signal using a first tap weight.

9. The mixed-mode signal processor of claim 1, wherein the mixed-mode DFE includes:
   a first comparator having a reset stage and an output stage; and a second comparator having a reset stage and an output stage, wherein the reset stage of the first comparator overlaps the output stage of the second comparator.

10. The mixed-mode signal processor of claim 9, wherein the mixed-mode DFE includes:
a converter that converts the first analog signal to a current signal;
a first polarity switching circuit that selectively adjusts a polarity of the current signal based on an output of the first comparator; and
a second polarity switching circuit that selectively adjusts a polarity of the current signal based on an output of the second comparator.

11. The mixed-mode signal processor of claim 10, wherein the mixed-mode DFE includes a current scaling circuit that receives outputs of the first and second polarity switching circuits and that scales the current signal using a first tap weight.

12. The mixed-mode signal processor of claim 1, wherein the mixed-mode signal processor is operated at frequencies above 1 GHz.

\* \* \* \* \*